United States Patent [19]

Orr et al.

[11] Patent Number: 5,818,737

[45] Date of Patent: *Oct. 6, 1998

[54] METHOD FOR GUIDING DEVELOPMENT OF MUNCIPALITY

[75] Inventors: Wilson W. Orr, Mayer; Raymond M. P. Miller, Scottsdale, both of Ariz.

[73] Assignee: City of Scottsdale, Scottsdale, Ariz.

[*] Notice: The term of this patent shall not extend beyond the expiration date of Pat. No. 5,652,717.

[21] Appl. No.: 900,765

[22] Filed: Jul. 25, 1997

Related U.S. Application Data

[63] Continuation-in-part of Ser. No. 735,336, Oct. 22, 1996, Pat. No. 5,652,717, which is a continuation of Ser. No. 285,830, Aug. 4, 1994, abandoned.

[51] Int. Cl.$^6$ .................................................. G06T 17/50
[52] U.S. Cl. ......................... 364/578; 395/920; 395/933
[58] Field of Search .................................... 364/578, 564, 364/512, 413.3; 395/920, 933; 434/130

[56] References Cited

U.S. PATENT DOCUMENTS

| | | | |
|---|---|---|---|
| 4,868,771 | 9/1989 | Quick et al. | 364/578 |
| 4,890,249 | 12/1989 | Yen | 364/578 |
| 5,005,147 | 4/1991 | Krishen et al. | 364/578 |
| 5,307,292 | 4/1994 | Brown et al. | 364/564 |
| 5,329,464 | 7/1994 | Sumic et al. | 364/512 |
| 5,375,074 | 12/1994 | Greenberg et al. | 364/578 |
| 5,652,717 | 7/1997 | Miller et al. | 364/578 |

OTHER PUBLICATIONS

"A Three–Dimensional/Stereoscopic Display and Model Control System for Great Lakes Forecasts", by C. Yen, K. Bedford, J. Kempf and R. Marshall, IEEE Visualization Conference, 1990, pp. 194–201.

"Visualizing n–Dimensional Implications of Two–Dimensional design Decisions", by S. Ervin, IEEE Visualization Conference, 1992, pp. 356–360.

"Computer–Aided Modeling for Interference Analysis in Urban Areas", by T. Mizuike et al, GLOBECOM '92: IEEE Global Telecommunications Conference, 1992, pp. 1858–1864.

"Machine Learning from Remote Sensing Analysis", by D. Charebois, D. Goodenough and S. Marwin, IEEE, Remote Sensing for the Nineties, 1993 (IGARSS), pp. 165–172.

"ADSM–An Automated Distribution System Modeling Tool for Engineering Analyses", by X. Wei, Z. Sumic and S. Venkata, IEEE, Transmission and Distribution Conference, 1994, pp. 46–52.

"Geographic Information Systems: Are They Decision Support Systems?", by L. Murphy, IEEE, System Sciences, 1995 Annual Hawaii Int'l Conference, vol. IV, pp. 131–140.

*Primary Examiner*—Kevin J. Teska
*Assistant Examiner*—Russell W. Frejd
*Attorney, Agent, or Firm*—Cahill, Sutton & Thomas P.L.C.

[57] ABSTRACT

A method for creating an electronic general plan for a municipality is described which is capable of providing projected results and effects based upon varying the inputted data as a function of the consequences of presently made or proposed decisions by the decisionmakers of the municipality. Sources of data collected from a plurality of sources are converted into an electronic database which may be automatically and/or manually updated periodically. A series of software modules utilize the data for a series of specific applications defined by the municipality. To portray the municipality at a specified future date, the methodology would utilize the full capabilities and data resident in the database. The output provided by modeling and simulation modules may be in the form of two- or three-dimensional visual presentations in an especially equipped multiple, computer-driven, projector screen room or may be in the form of a printed media for binding and distribution with screen images combined with text.

24 Claims, 5 Drawing Sheets

Figure 2: EGP Components

Figure 6: Typical facility

METHOD FOR GUIDING DEVELOPMENT OF MUNCIPALITY

CROSS-REFERENCE TO RELATED APPLICATIONS

The present application is a continuation-in-part application of an application entitled "APPARATUS AND METHOD FOR COLLECTING, ANALYZING AND PRESENTING GEOGRAPHICAL INFORMATION", filed Oct. 22, 1996 and assigned Ser. No. 08/735,336, now U.S. Pat. No. 5,652,717 issued Jul. 29, 1997, which is a continuation of application Ser. No. 08/285,830, filed Aug. 4, 1994, now abandoned, and describing an invention of the present inventors.

BACKGROUND OF THE INVENTION

1. Field of the Invention

The present invention relates to the collection, integration, manipulation, modeling, and presentation of various local, regional, and/or global data and, more particularly, to the creation of a general plan for a political unit or municipality based upon such data to guide the short term and the long term development of the political unit.

2. Description of Related Art

The provision of a general plan is usually mandated by law for an incorporated political unit or municipality or community (hereinafter collectively referred to as "municipality"). Heretofore, such a general plan consists of a printed document having several sections with each section being directed to specific areas of particular interest, such as zoning maps, transportation corridors, population densities, tax bases, parks and public recreational areas, etc. This document is intended to be used to guide the growth and development of the municipality. For example, requests for zoning changes are referenced to the general plan to determine the validity and approval of a requested land use.

Historically, the data upon which a general plan is based has been manually collected or otherwise generated by separate entities within the municipality. Cross-relationships amongst the groups of data of a general plan, such as transportation, environmental concerns, historical preservation, economic baselines, zoning, building codes, utility provisions, etc., have been minimal and any such cross-relationships have had to be manually constructed. Because such general plans are written documents, they are incapable of integrating robust models and simulations necessary to provide decisionmakers of the municipality with various outcomes based upon different possible courses of action that may be taken. The capability to include global change variables as inputs to local planning processes is non-existent. Moreover, existing documents setting forth a general plan are incapable of presenting to decisionmakers two or three-dimensional representations of the probable context of a municipality 50–100 years into the future; nor can such a document portray a range of possible outcomes based upon current development and growth decisions. Typically, the cost for preparing a general plan at the present time for a municipality may cost half a million dollars and require approximately a year to complete. By the time of completion, much of the information contained therein will be obsolete or in error.

Although the document setting forth a general plan is intended to guide the development and growth of a municipality, it is incapable of providing an evaluation of the outcomes of various proposed development scenarios. Thus, a particular and severe flaw of all current general plans is the inability to project, in three-dimensions, the future outcomes of current actual and proposed decisions.

SUMMARY OF THE INVENTION

The present invention is directed to a method for creating a general plan for a municipality which is capable of providing projected results and effects based upon varying the inputted data as a function of the consequences of presently made or proposed decisions by the decisionmakers of the municipality. Sources of data, such as utility billing, zoning changes, new building permits, approved new construction, infrastructure changes (transportation, stormwater, parks, and recreational facilities, etc.), demographic changes, community economic base variations, new legislation (whether local, county, state, or federal), environmental health indicators, jurisdictional financial changes, etc. are converted into an electronic database which may be automatically and/or periodically updated. The data is collected from a plurality of sources, including remote sensing for infrastructure changes and new construction verification, local climatic variations (such as urban heat island effects), environmental factors, etc. Electronic media is used to achieve direct transfer of utility billing, new housing starts, park usage data, selected environmental information, jurisdictional financial records/forecasts, and other data automatically updated by various departments of the municipality. Manually tabulated data, such as new legislation, population and demographic changes, community economic base changes that cannot be electronically collected is formatted for compatibility with the database and transferred to the database. Additionally, data available from a geographic information system (GIS) may be accessed for direct transferral and continual update of the relevant portions of the database. A series of software modules will utilize the data for a series of applications defined by the municipality. For instance, a modeling and simulation module will provide a range of future scenarios for the municipality based upon the data inputted and given assumption sets and decision options. For a simple transportation module, only limited data and modeling capability is necessary. However, to portray the municipality three-dimensionally at a specified future date would necessarily utilize the full capabilities and data resident in the database. The output provided by modeling and simulation modules may be in the form of two- or three-dimensional visual presentations in an especially equipped multiple, computer-driven, projector screen room or may be in the form of a printed media for binding and distribution with screen images combined with text. Special software for presentation purposes to staff or at public meetings may be employed to portray and visualize specific or simulated presentations.

It is therefore a primary object of the present invention to provide a method for creating a general plan based upon numerous data sources for guiding a municipality in making short term and long term decisions.

Another object of the present invention is to provide a method for collecting and combining data relevant to a general plan for a municipality.

Yet another object of the present invention is to provide a method for projecting the effect upon a municipality of present and proposed decisions by decisionmakers of the municipality.

Still another object of the present invention is to provide a method for simulating the total effect upon a municipality of man-made decisions affecting selected aspects of the municipality.

A further object of the present invention is to provide a method for projecting the effect upon a municipality by forecastable natural events and changes that may occur.

A yet further object of the present invention is to provide a method for determining the effect upon a municipality resulting from simulated natural or man-made events.

A still further object of the present invention is to provide a method for making presentations of a general plan as it might be modified by simulating events that may occur.

These and other objects of the present invention will become apparent to those skilled in the art as the description thereof proceeds.

BRIEF DESCRIPTION OF THE DRAWINGS

The present invention will be described with greater specificity and clarity with reference to the following drawings, in which:

FIG. 5 illustrates the data input and manipulation of the data to provide a basis for formulating a general plan for a municipality; and FIG. 6 illustrates a representative setting for reviewing, discussing, and approving a general plan.

DETAILED DESCRIPTION OF THE PREFERRED EMBODIMENT

Figure 1:
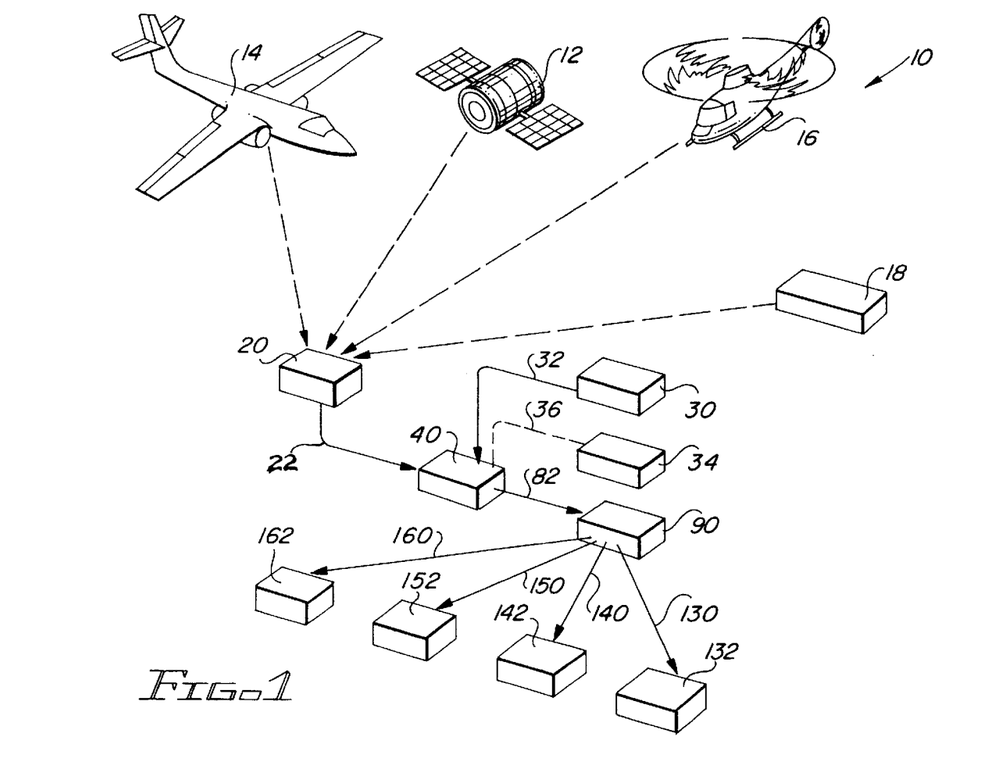
FIG. 1 is a block diagram schematically representing the information gathering and routing system.
Figure 2:
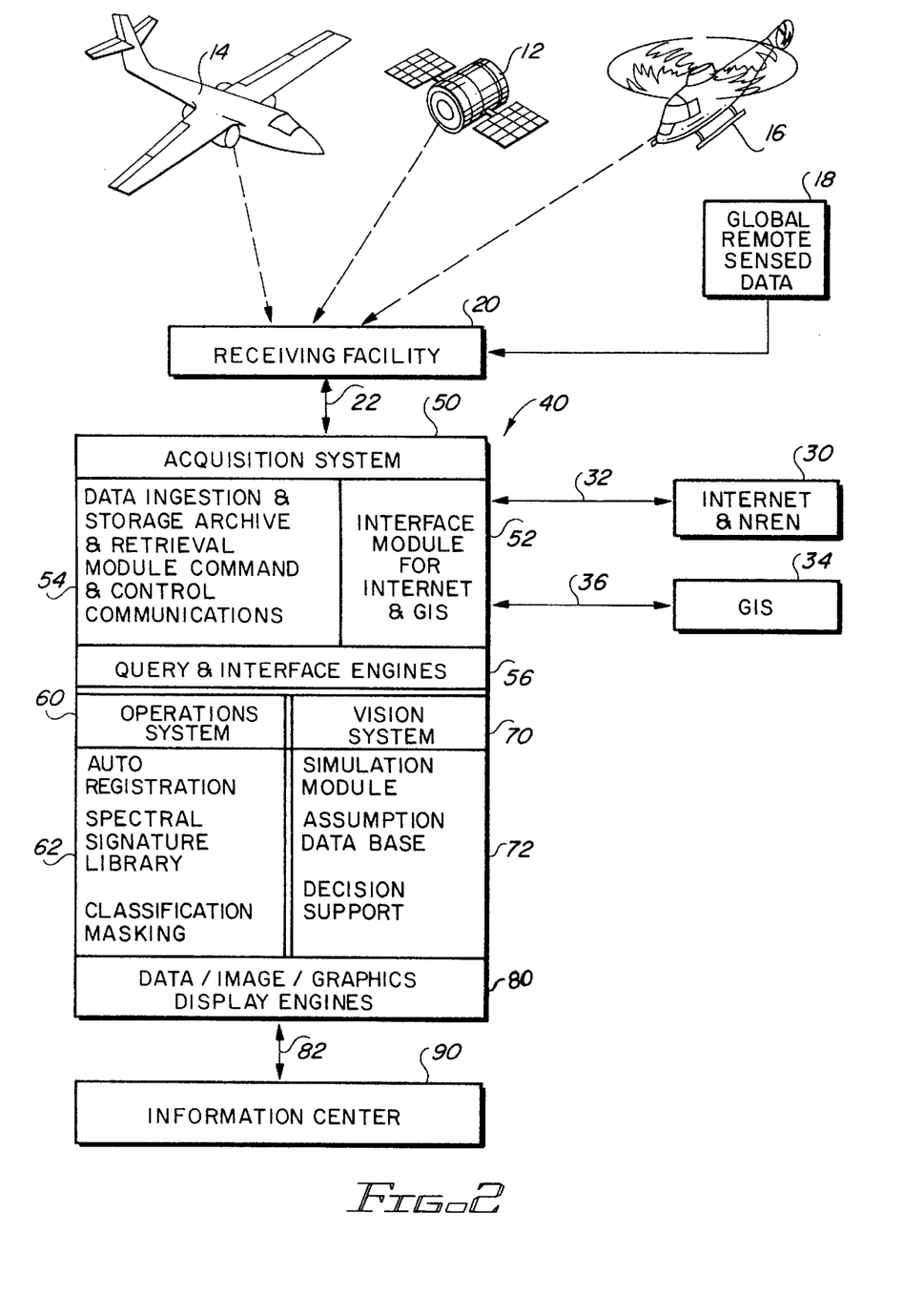
FIG. 2 is a block diagram depicting subsystems of the system shown in FIG. 1.

Referring to FIG. 1, there is shown a block diagram schematically illustrating an enhanced geographical information system 10. In particular, it illustrates the gathering of the information to be processed and the flow of the information after the gathering, including the processing and distribution of the information to ultimate users. FIG. 2 illustrates some of the hardware and software modules embodied in and broadly shown in FIG. 1. Information in any of various formats may be received by a data reception ground station 20 from several different sources. These sources may include an earth circling satellite 12, an aircraft 14, and a helicopter 16. The helicopter represents a local aircraft or an earth bound fixed sensor, such as a sensor atop a mountain or a tall building, etc., which gathers essentially local information. Aircraft 14 may be a type of reconnaissance aircraft that may cover a relatively large area for data gathering purposes. For example, aircraft 14 may provide multispectral radar, and lidar information, infrared data, photographs, and/or other information and helicopter 16 may provide primarily photographic and video information of a local area or some part or parts thereof. Satellite 12 may provide multispectral radar data, radar data, photographic information, infrared data, lidar data, sidar data and the like. There are many kinds or sources of data that are now available, and more types of sources of data will be available in the future, which are representatively depicted by satellite 12, aircraft 14, and helicopter 16. With contemporary technology, data from any of these sources may be transmitted to one or more earth stations 20.

With respect to terminology, it will be noted that multi-spectral data or information is generally considered as passive systems for deriving information. Radar, lidar, and sidar are typically considered active systems for deriving information from a transmitted signal reflected by an object of interest and received at a receiving station. Global remote sensed information/data, including global positioning system (GPS) and global climate change models, may be received by ground station 20. A block 18 represents the source(s) for such information/data.

The information/data gathered is transmitted from ground station 20 through appropriate transmission elements 22, such as wireless, fiberoptics, or cable elements to a central location 40. The central location includes the software and hardware necessary for processing the received information incorporated in three primary systems. These primary systems are an acquisition system 50, an operations system 60, and a vision system 70. The acquisition system includes an interface module 52 for receiving information from an Internet and a NREN station 30 through transmission line 32 and from GIS station 34 through transmission line 36. These stations provide regional and global information, respectively. The information available from Internet and NREN station 30 may come from any number of centers or sources. The data is transmitted to the interface module 52 from stations 30,34 by appropriate communications channels or transmission lines, as depicted.

Data may be received from numerous sources, as indicated above, such as from land based, airborne or space based sensor platforms, or from data libraries of various types. The data may be fed directly to central location 40 in real time or near real time. Remote sensed data, such as multi-spectral radar, lidar, and sidar, is routed to central location 40 where it is processed, manipulated, and archived. At the central station, data is routed to the appropriate hardware and software elements, as desired or required. The information represented by the data is analyzed, collated, and processed appropriately for use. The "use" may be multiple uses, depending on the users. That is, different users may desire different information, and the information is processed to provide single or multiple users with virtually any type of information from the data. The data may be retrieved, further manipulated, and presented through use of software and hardware elements in an interactive venue, such as might be designed for group decision support in a setting, such as an information center 90 illustrated in FIG. 3.

Three primary systems are integrated, as best shown in FIG. 2. One system is acquisition system 50, the second system is operations system 60, and the third system is vision or visioning system 70. Acquisition system 50 includes an interface module 52 which may interface with a generic geographic information system (GIS) station 34. Module 52 provides the interface software for subroutines with the generic GIS and the communications software for direct linkage with remote sensors. It may link continuously with several different sensor instruments on satellites or aircraft that provide selective hyperspectral scanning of the electromagnetic spectrum, radar imagery, which may be multi-polarized, and laser imagery (lidar), which may be similarly polarized. The module may then provide instantaneous or prerecorded information of value to the users. Initial processing of raw multi-spectral, real time data from aerial and space based platforms is performed within this module and it includes the hardware necessary to run the software and to facilitate data movement. After initial processing of the Internet and NREN data received from station 30 by interface module 52, the module communicates with a module 54 that provides various functions, such as data ingestion and storage, archive and retrieval, command and control, and communications relevant to the processed data.

Figure 3:
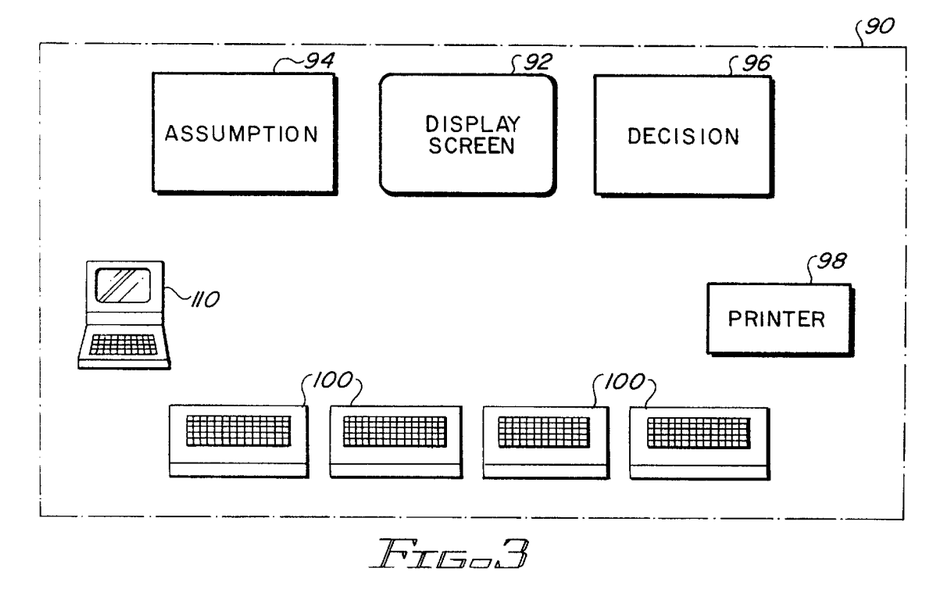
FIG. 3 is a block diagram illustrating an information center.

A plurality of direct display screens 92 may be used in information center 90 and controlled by interactive keyboards/LCD displays (consoles 100), as shown in FIG. 3. For example, a user may wish to see the aerial photography for a one mile buffer around a specific land address. The information is passed to the database query and interface engine 56 (FIG. 2) which locates the appropriate records. A unique identifier and task request is sent to block 80 wherein a graphics engine expands the geometry of the subject parcel of land for the one mile radius. Finally, the geometry of the buffer is passed to an image display engine and a data display engine which extracts only the portion of the image needed and sends the results on a transmission line 82 to a display screen 92 for display at information center 90.

Operations system 60 provides for remote sensed data transfer, manipulation, and display for current operations and user functions through software. Some of the functions include auto registration, spectral signature library, classification, and masking, as illustrated in block 62. The essential functions or sub modules for operations system 60, as listed in abbreviated form in block 62, include:

1. Automatic registration of multi-spectral, hyperspectral, radar, or lidar imagery:
   a) This module contains the subroutines necessary to automatically identify the data imagery type and to auto register, or align, this imagery or attribute information with the GIS database; and
   b) The GIS database provides known ground features to provide overall control points for rectification of the imagery. Only features with pronounced active or passive signatures, static physical characteristics and appropriate geographic locations will be identified, such as a canal, tree, vehicle, or building, etc. An algorithm then analyzes the imagery and matches the known ground control shapes, transferring the coordinate geometry of the GIS database features to the given image. This operation may be done through several correcting iterative processes by increasing the number of ground control features each time until an acceptable deviation is achieved.
2. High resolution multi-spectral, radar, and lidar imaging signature libraries:
   a) This library provides reference data for atmospheric, land surface, and subsurface features, vegetation, life forms, conditions, and attributes within any desired region, such as, for example, the southwestern United States region. This is a reference library for comparison with new remote sensed data, permitting feature identification, whether atmospheric, land surface, or subsurface;
   b) GIS registered, high resolution, multi spectral hyperspectral, and radar or lidar imagery is ground truthed and synthesized to build an optimal signature library. The imagery is superimposed with known features within the GIS database, such as pavement, roof tops, etc., to determine the most common signature return for the given feature;
   c) Since many factors can affect the signature return of any given feature, such as angle or pitch of the camera, shadows, etc., variances in the signature library occur. These variances are mathematically calculated to determine allowable tolerances within the signature band for each feature. Each spectral band within the spectral range for a given feature is examined for return values and optimally predictive values are calculated. This depicts the most common spectral return for the given band; and
   d) Next, tolerances are calculated by finding the minimum and maximum values in which a certain percentage of the returns for a given band belong. Finally, the signature library elements are tested and verified against or with known signatures for the region's known imagery to insure the classification accuracy of the data.
3. Classification module:
   a) This module interprets the data stream and is equipped to recognize atmospheric, surface, and subsurface constituent features and attributes by spectral signature or reflected image comparison with reference to the signature library discussed above.
4. Masking module:
   a) This module scans the data to produce an image which will present special features, such as a roof type or hydrant location, for example, and search for a given signature or indication, such as a particular pollutant, vegetation type, land characteristic, attribute, or object, or for a given coordinate set with a listing of selected attributes; and
   b) Following classification and/or masking, data are sent to the vision system or to an integrated user interface module, discussed below, for display and dissemination to a user. Data may be returned to vision system 70 repeatedly for additional processing, as desired. Geographical addressing, coordinate selection, attribute queuing, and zoom or magnification features are contained within this module.

General applications developed using vision system 70 include:

1. Environmental change monitoring, compliance, and enforcement;
2. Transportation monitoring, analysis, and planning;
3. General planning, growth assessment, and management;
4. Zoning and building code enforcement; and
5. Public protection and emergency/disaster response services.

Sample applications of this vision system include: hazardous materials dumping by type, location, and time; police (law enforcement) transit, service, utility, or other vehicle location and status; watershed status; impending weather related events; regionally coordinated disaster incident management; traffic vehicle counts by time of day and location; tracking of vehicles, biological and nonbiological objects, or other entities; transportation planning; zoning monitoring and enforcement; crime evidence gathering; development plan review and tracking; air quality analysis; sources and movement of pollutants; long term trends of various types; construction progress monitoring; and permit and other violations.

Visioning system 70 may provide dynamic visual and financial simulations of a region's future, given an assumption set and a predetermined series of development or policy decisions. It is intended to project into a long range time frame and incorporate global change data through a high speed data channel. Global data is regionalized, utilizing special subprogram software to combine emerging local climatic models with larger data sets. This subprogram accesses global environmental information data and modeling to assist a municipality in developing long term strategies which integrate with global environmental trends and emerging guidelines for sustainable development.

The following subroutines, depicted in block 72, are a part of vision system 70:

1. Simulation:
   a) Digital image manipulation and simulation capability utilizes advanced processing capabilities applied to environmental, economic, and social models developed as part of the module subroutines; and
   b) Optical image manipulation and simulation also utilizes advanced processing, but filters the image of elements not requiring update for the next image. An image library is established for a local community to use for fly through/bys and "what if" scenario generations.

2. Assumption Set and Database:
   Simulation scenarios derive from a set of assumptions, regarding, in part:
   a) Global/regional/local environmental factors (climate change, costs assigned to pollutants, new pollutants, totally internalized resource costs);
   b) Global/regional/local economic factors (rate of inflation, interest rates, sources of GNP and local incomes, new products and specification, existing material and product performance specifications, areas, tax rates); and
   c) Global/regional/local social, cultural, demographic factors (population forecasts, health costs, educational levels and provisions).

3. Decision Support Module:
   a) Simulation scenarios depend on the policy and development decisions made by a community, government, or user organization. These are categorized in this module to include likely outcomes for a variety of policies, development alternatives, and infrastructure projections with regard to cost, usage rates, and life cycle costing of materials.

This module includes group decision support software which may be user confidential and individually interactive at each user's console 100, (see FIG. 3), and at remote locations. A typical facility is depicted in FIG. 3 as information center 90 that may serve citizens, council commissions, senior management/planning meetings, etc. Obviously, this facility may be adapted to various user groups or organizations requiring the integration of multiple data sets, imagery, and group decision The entire system is appropriately interconnected, such as by fiber optics, to all appropriate user departments and offices to create a virtual network that integrates across user groups. As a national "Information Highway" is developed, the system may be connected to include other, or more, remote locations.

Information center 90 includes a plurality of interactive consoles 100 connected to the central location 40 by appropriate elements. A plurality of communications lines 130, 140, 150, and 160 are illustrated in FIG. 1 as extending to different centers 132, 142, 152, and 162, respectively, where the gathered and processed information may be used by users. One such user may be information center 90, connected to the central location 40 by an appropriate transmission line 82 from data/image/graphics display engines depicted in block 80. Block 80 represents the software and hardware which interfaces with the information center 90 and the central location 40. It will be understood that the various modules, engines, etc., within the central location 40 communicate with each other as required to analyze, retrieve, etc., the data as requested by users at consoles 100 . . . 106, etc.

At the front of the information center 90, and in front of the consoles 100, may be a large display screen 92. By use of the consoles 100, the users may call up and have displayed desired information on the display screen. Moreover, the information displayed on display screen 92 may be manipulated and otherwise used or varied as desired. A master control console or facilitator console 110 is shown in FIG. 3.

Some examples of the applications available are set out below. The examples are illustrative only, and not exclusive. Different users may sit at consoles 100. Facilitator console 110 may provide assistance for the users at the consoles. Hard copies of data may be provided by a plotter or printer 98 or similar image/data rendering device, or transmitted to a playback device for later usage, as desired.

On opposite sides of the display screen 92 are an assumption screen 94 and a decision screen 96. The purpose of these screens is to aid the users in making decisions based on provided data. The assumptions may include resource, pollutant costs, and service levels as a minimum in arriving at proper decisions. Decision screen 96 will display the chosen decision tree, generally regarding changes to the natural environment. The display screen 92 will display visually and dynamically the long term results of the proposed changes.

Remote centers 132, 142, 152, and 162 are shown in FIG. 1. These remote centers may represent departments, agencies, private individuals or entities, schools and universities, federal agencies, other political units, etc., tied into or part of system 10.

The following examples set forth various and representative uses that may be accommodated by system 10:

EXAMPLE NO. 1

An "old" map shows water meters and sewer manholes at specific locations on a given street. With a hand held GPS transmitter, a person may walk along the street and activate the GPS transmitter at the water meters and manholes. GIS satellites receive the transmissions and relay the coordinates of the exact locations from where the transmissions were sent. The information is processed and is used to verify the "old" information and to correct any errors. The "new" information thus received and processed provides correct location information for the various water meter and sewer manholes.

EXAMPLE NO. 2

A new subdivision is planned for a section of land which includes hills, dry water courses and certain types of desired vegetation. The section of land has been photographed, etc., and the information is in the system memory. The information on the desired section is brought up on a computer screen and the information is analyzed. Appropriate printouts may be made for detailed analysis. The information provided includes details on the vegetation so that lot lines, roads, etc., may be plotted to have minimum adverse effect on the vegetation and on the natural water courses, etc.

EXAMPLE NO. 3

Aerial photographs of an area are processed with maps to show correct lot boundaries, misaligned walls and fences, and other desired information.

EXAMPLE NO. 4

Radar imagery is preprocessed and auto registered to a GIS mapping system which overlays parcel property lines.

The resulting image can be automatically interpreted or "read" to determine the surface area and percent slope on any given ownership parcel. This yields buildable/unbuildable percentages and ultimately derives a slope analysis for the parcel. These parcels, and their attributes, can be aggregated to provide a basis for transaction negotiations, tax assessment, and other values which are slope dependent. The radar data provides highly accurate elevation data from the which the slope composite imagery is constructed.

EXAMPLE NO. 5

An agency responsible for reviewing, revising, approving, monitoring construction progress, and otherwise dealing with land use and architectural plans may require these to be submitted in computer assisted design (CAD) format on magnetic or optical media. Plans thus digitized may be merged into the GIS resident, remote sensed imagery to create dynamic, three-dimensional and realistic presentations of the finished development of a capital improvement project. The simulation software merges the digitized plan with change models and simulates visually how the project will look in the distant future. Plan check submodules approve, or disapprove the project based on its long term impacts as determined by this simulation capability.

EXAMPLE NO. 6

The visual simulations set forth in Example 5, above, may be integrated with economic, social, and environmental cost forecasts to determine a project's impact on the sustainability of the community, or ability to function without negatively impacting the future wellbeing of the community.

EXAMPLE NO. 7

A developer's plans are submitted on electronic optical or magnetic media and integrated with existing regulatory data and video of the proposed area to 1) verify plan compliance with city/state/federal codes, and 2) simulate how the proposed project, if built, would appear and impact the community in the distant future.

EXAMPLE NO. 8

City planners utilize the system to design and update the city's land use plan. Transportation planners, storm water planners, etc., will visualize the land use plan concurrently during the design phase and assess impacts of the plan with regard to transportation, storm water, etc. Recommendations and manipulations can be made by the transportation planner and the impact of such recommendations and manipulations can be visualized in three-dimensions. This process allows for group interaction in city planning through the integration of existing city models and the visualization of model inputs and outputs.

Figures 1, 4:
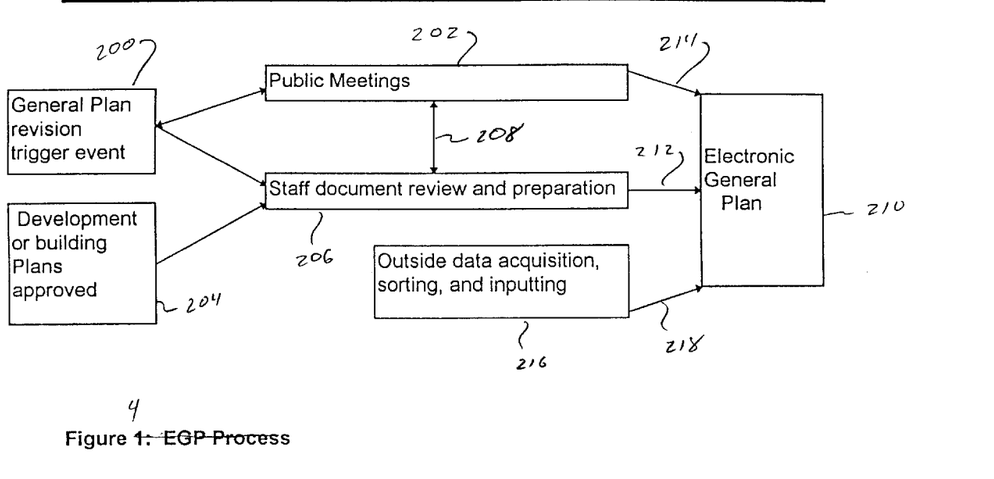
FIG. 4 illustrates an outline of the steps for developing a general plan for a municipality.

Referring to FIG. 4, there is shown a block diagram of the process for developing an electronic general plan (EGP). As depicted by block 200, a trigger event occurs initially to revise an existing general plan, which general plan is usually required by statutes pertaining to the affected municipality. Such trigger event may be as a result of public meetings (block 202) or other events. Future development or building plans approved or to be approved (block 204) are submitted to the staff of the municipality for review and preparation of documents pertinent thereto (block 206). Such review and preparation may require public meetings for approval, comment or as a matter of information, as represented by arrow 208. Data and other information acquired by staff of the municipality are prepared for inclusion in the electronic general plan 210, as represented by arrow 212. Concerns affecting the general plan may also be provided through public meetings, as represented by arrow 214. Acquired data (block 216), from any of the sources depicted in FIGS. 1 and 2 and discussed above, are collated, sorted, and inputted to the electronic general plan, as depicted by arrow 218. Through this process, the various departments of the municipality have an opportunity to make contributions in their respective fields of expertise and based upon factual information. Furthermore, the public affected has an opportunity to voice its concerns and desires for the future development of the municipality. The humanitarian concerns are correlated with and modified by judgments and decisions made by experts and consultants of the municipality and substantiated by unemotional data of all types available and pertinent. With such plethora of inputs, a viable and useful long range electronic general plan can be developed and continuously updated on a real time basis.

Referring to FIG. 5, further details of the process for developing the electronic general plan will be described. A plurality of software modules which perform separate and distinct functions to acquire and process data needed by decisionmakers to shape the growth and development of their municipality are part of the steps of the method for developing an electronic general plan 210 for the municipality. These modules may all be utilized to generate a complete electronic general plan or revise an existing general plan. Less than all of the modules may be employed to accomplish smaller elements or subsections of a general plan. It is intended that the modules be interactive and selectively utilized.

Data may be ingested from several sources and by several types of modalities, as discussed above. To recapitulate, these include:

1. Manually—this module permits users to access the data files directly to input information which is not automatically fed to a central database.
2. Automatically—this module interfaces the data files directly with sources such as plan review and building permitting, zoning records, property and tax records, public safety, economic information, utility information, etc. As jurisdictions continue to automate data collection, the percentage of automatic transfers to the database will increase and the manual data inputting tasks will decline.
3. Directly—from a GIS database. This information may be relational or spatial (raster or vector) and generally contains at least part of the data that can be automatically linked with the database.
4. From the Internet—primarily data relevant to regional/global change which will be inputted to the modeling and simulation modules.
5. Remote sensed data—acquired by means other than fixed sensors or sources and includes satellite or aircraft based sensing systems. The data may be inputted to the data in real time or otherwise.

These multiple sources are combined to form a digital representation of the municipality in digital jurisdiction module 230. It may be queried by various users for specific information regarding the common vision of a municipality, the as-built status, its permissible land uses by zoning type, revenues per parcel or grouping of parcels, crime rates by area, commercial revenues, paving types, utility data, etc. This software module and database is the central portion of the EGP and contains all the information, grouped by category, that is used to respond to queries or feed to the various models used in decision support.

The tasks of the data access and processing module 232 include the management of all the data files and supporting modules, i.e. the other blocks depicted in FIG. 5. This includes the routing of data queries and the serving of data for user requests, be they internal to other modules or external (generated by human users).

A module 234 identified as the master model file (MMF) stores the individual models which represent the various elements of a municipality. The heretofore isolated models are represented as submodels in block 234. This module contains the software necessary to integrate, combine, and simplify the outputs of individual model elements. The dynamics of global change will be an external input to a separate model element within this block which identifies the relationships between global change and local vitality. This senior model will abbreviate the submodels to summarize their input-output relationships with global factors.

A module 236 identified as the simulation module (SM) can connect and integrate all extant, but heretofore isolated models descriptive of individual elements of a jurisdiction, such as transportation, stormwater, financial, public safety, etc. This will be accomplished by integrating and formatting software. This module adds the fourth dimension, time, to the two or three-dimensional model(s) resident in MMF module 234. By applying a variety of assumptions and decision options to single model or to integrated models, the future results of current decisions are developed. Methods of data simulation include the ability to utilize the capability of the MMF module to accept a different set of input factors and produce a simulated situation in a future time for the jurisdiction. SM module 236 will be capable of trend extrapolation (using a variety of methodologies, i.e. linear, logarithmic, cross indexed, etc.) for a variety of data sets within the MMF module. Future scenarios may be generated for a variety of times as distant as 100 years. Special envelope triggers would alert the users to future conditions which overstep the boundaries of an envelope of acceptable futures. The variability of input factors and the assignment of trend characteristics will identify the sensitivity of the community to a number of variables, some currently extant and some which may become relevant only with the passage of time. The SM module will include the capability to inject totally new factors into the model at given future points in time. These would include technological breakthroughs, dramatic demographic shifts, catastrophic weather events, new public (citizen) concerns, drastic resource price changes, etc. which may not be evident in current data or trend analysis. An element of the SM module will be an entity based modeling component which will grow a community or situation resulting from the assignment of certain features and characteristics to an individual(s) deemed typical of the municipality's citizenry or other shaping elements. A time period will be assigned with the entity able to reproduce (add more entities within its given characteristic envelope) and use resources (as defined by the characteristic envelope) to produce a wide range of community scenarios. The entity based modeling component will be utilized to provide a simpler modeling alternative to standard models which require enormous computing capability.

Methods of data presentation include two elements: 1) special software, visualization module 238 (VM), to move the viewer(s) in real-time through a real or simulated representation of the jurisdiction, either in current or future time in three dimensions. The VM module will also overlay, or co-display, charted two- or three-dimensional data sets which change to portray data dynamically as the spatial or temporal aspect of the viewer(s) is varied. Thus, VM module 238 will portray complex data using simple visual media; 2) the development of special facilities (block 242) (FIG. 3) in which viewer(s), i.e. the decisionmakers for the municipality, can view on any number of computer driven screens sufficient visual information to more easily make informed decisions regarding the growth and development of their municipality. The facility and its computer hardware will be capable of producing visual and realistic multi-media representations of the jurisdiction using the features of the EGP in a comfortable setting for citizens and decisionmakers.

The method of decisionmaking will be aided by special software, decision support module 2methodologies dew methodologies developed to increase citizen participation in the planning process. The DSM module will assist groups of decisionmakers by using interactive computer terminations which permit individuals to select topics or geographic areas of concern, assign a ranking to each of these, select levels of funding, etc. The DSM module will then combine the various inputs and visually present to the group the areas of major agreement and dissent. DSM module 240 will maintain an electronic record of the issue identification process, recommendations and voting for resolution, and the final decision of the group.

All of the EGP modules will be interactive and may be utilized to any desired degree to assist with the decisions at hand.

As shown in FIG. 6, a special facility 242 (which may be like information center 90) for using the electronic general plan may be employed. Such facility would include an area 244 reserved for public seating. A stage 246 provides a forum for presenting information attendant the electronic general plan. The stage may include a presentation area with specialized computer driven screens, as depicted in block 248. The information provided on these screens would be under control of the presenters. A technical staff for providing the information to be displayed may be seated within an area identified as block 250. Within this area, facilitators and technical support personnel would be located to perform their respective functions. For public meetings at which the press may be present, a special area may be designated, as represented by block 252 to permit viewing by the press of information displayed and listening to presentations made. This area may be cordoned off as depicted by curved panel 254.

While the invention has been described with reference to several particular embodiments thereof, those skilled in the art will be able to make the various modifications to the described embodiments of the invention without departing from the true spirit and scope of the invention. It is intended that all combinations of elements and steps which perform substantially the same function in substantially the same way to achieve the same result are within the scope of the invention.

What is claimed is:

1. A method for collecting data and presenting an electronic general plan for a municipality that may be converted to a documentary or to a visually perceivable format, said method comprising the steps of:

(a) acquiring factual natural and man-made electronic general plan information on a real time basis;

(b) identifying subject matter of the real time factual information;

(c) ingesting and storing the identified factual information;

(d) retrieving pre-existing factual electronic general plan information of selected subject matter from a source;
(e) correlating selected ingested information with corresponding retrieved information;
(f) compiling the correlated information into the electronic general plan;
(g) analyzing the compiled information to obtain simulation scenarios of the impact upon the electronic general plan due to either actual or anticipated variations of the factual information; and
(h) selectively presenting the compiled or analyzed electronic general plan for review and study.

2. The method as set forth in claim 1 including the step of deleting any retrieved information commensurate with any ingested information to render most current the correlated information.

3. The method as set forth in claim 1 including the step of simulating the electronic general plan in at least one future time period based upon the ingested and the retrieved information.

4. The method as set forth in claim 1 wherein said step of retrieving includes the step of using the retrieved electronic general plan information and the ingested information to develop simulated electronic general plan information in a predetermined time period.

5. The method as set forth in claim 1 wherein said step of presenting includes the step of imaging a selected one of the compiled information and the simulation scenarios in a visually perceivable format.

6. The method as set forth in claim 1 wherein said step of presenting includes the step of displaying the compiled information in more than one format.

7. The method as set forth in claim 1 wherein said step of correlating includes the step of creating different combinations of the ingested information and the retrieved information and wherein said step of compiling produces a plurality of compilations of information.

8. The method as set forth in claim 7 wherein said step of presenting includes presentation of the plurality of compilations.

9. The method as set forth in claim 1 wherein said step of presenting includes the step of displaying the projections resulting from said step of analyzing.

10. The method as set forth in claim 9 wherein said step of displaying includes the step of displaying the projections in more than one format.

11. The method as set forth in claim 1 including the step of simulating the effect upon the compiled information as a result of varying the factual information.

12. A method for collecting natural and man-made information and presenting an electronic general plan for a municipality, said method comprising the steps of:
   (a) acquiring factual natural and man-made electronic general plan information on a real time basis;
   (b) identifying subject matter of the real time factual information;
   (c) retrieving pre-existing factual electronic general plan information of selected subject matter from a source;
   (d) correlating selected identified information with corresponding retrieved information;
   (e) analyzing the correlated information to obtain simulation scenarios of the impact upon the factual information due to either actual or anticipated future variations of factual information; and
   (f) selectively presenting the correlated and analyzed information as part of the electronic general plan.

13. The method as set forth in claim 12 wherein said step of correlating includes the step of replacing the retrieved information with corresponding acquired information to present up-to-date factual information.

14. The method as set forth in claim 12 wherein said step of correlating includes the step of compiling the correlated information in more than one time period.

15. The method as set forth in claim 13 wherein said step of correlating includes the step of compiling the correlated information in more than one time period.

16. The method as set forth in claim 12 wherein said step of presenting includes the step of imaging a selected one of the correlated information and the simulation scenarios in a visually perceivable format.

17. The method as set forth in claim 12 wherein said step of presenting includes the step of displaying the correlated information.

18. The method as set forth in claim 12 wherein said step of presenting includes the step of displaying the projections resulting from said step of analyzing.

19. The method as set forth in claim 18 wherein said step of displaying includes the step of displaying the projections in more than one format.

20. The method as set forth in claim 12 including the step of simulating the effect upon the correlated information as a result of varying the factual information.

21. A method for projecting the effect in an electronic general plan of a municipality resulting from varying collected natural and man-made electronic general plan information, said method comprising the steps of:
   (a) acquiring factual natural and man-made electronic general plan information on a real time basis;
   (b) identifying subject matter of the real time factual information;
   (c) ingesting and storing the identified factual information;
   (d) retrieving pre-existing factual electronic general plan information of selected subject matter from a source;
   (e) correlating selected ingested information with corresponding retrieved information;
   (f) varying selected parameters of the ingested factual information;
   (g) compiling the correlated information and the varied information;
   (h) analyzing the compiled information to obtain simulation scenarios for the electronic general plan of the impact resulting from the selected variations of the factual information; and
   (i) presenting the analyzed simulation scenarios of the electronic general plan for review and study.

22. A method for projecting the effect in an electronic general plan of a municipality resulting from varying collected natural and man-made electronic general plan information, said method comprising the steps of:
   (a) acquiring factual natural and man-made electronic general plan information on a real time basis;
   (b) identifying subject matter of the real time factual information;
   (c) ingesting and storing the identified factual information;
   (d) retrieving pre-existing factual electronic general plan information of selected subject matter from a source;
   (e) correlating selected ingested information with corresponding retrieved information;
   (f) varying selected parameters of the acquired factual information;

(g) compiling into the electronic general plan the correlated information and the varied information;

(h) analyzing the compiled information of the electronic general plan to obtain simulation scenarios of the impact resulting from the selected variations of the factual information; and (i) presenting the analyzed simulation scenarios of the electronic general plan for review and study.

23. A method for projecting the effect in an electronic general plan of a municipality resulting from varying collected natural and man-made electronic general plan information, said method comprising the steps of:

(a) acquiring factual natural and man-made electronic general plan information on a real time basis;

(b) retrieving pre-existing factual electronic general plan information of selected subject matter from a source;

(c) correlating selected identified information with corresponding retrieved information;

(d) varying selected parameters of the retrieved factual information;

(e) analyzing the correlated information to obtain simulation scenarios of the impact resulting from the selected variations of factual information; and (f) presenting the analyzed simulation scenarios of the electronic general plan.

24. A method for projecting the effect in an electronic general plan of a municipality resulting from varying collected natural and man-made electronic general plan information, said method comprising the steps of:

(a) acquiring factual natural and man-made electronic general plan information on a real time basis;

(b) retrieving pre-existing factual electronic general plan information of selected subject matter from a source;

(c) correlating selected identified information with corresponding retrieved information;

(d) varying selected parameters of the acquired factual information;

(e) analyzing the correlated information to obtain simulation scenarios of the impact upon the electronic general plan resulting from the selected variations of factual information; and (f) presenting the analyzed simulation scenarios of the electronic general plan.

* * * * *